United States Patent [19]
Bernard et al.

[11] Patent Number: 5,293,211
[45] Date of Patent: Mar. 8, 1994

[54] MICROREFLECTOMETER SYSTEM

[75] Inventors: Jay M. Bernard, Torrance; Harold Mirels, Rolling Hills Estates; Eugene B. Turner, Torrance, all of Calif.

[73] Assignee: The United States of America as represented by the Secretary of the Air Force, Washington, D.C.

[21] Appl. No.: 543,657

[22] Filed: Oct. 6, 1983

[51] Int. Cl.$^5$ .................. G01B 9/00; G01N 21/00; G01N 21/55

[52] U.S. Cl. ................... 356/124; 250/572; 356/237; 356/445; 356/447

[58] Field of Search ............ 356/124, 237, 445, 447; 250/572

[56] References Cited

U.S. PATENT DOCUMENTS

| | | | |
|---|---|---|---|
| 2,451,501 | 10/1948 | Liben | 88/14 |
| 3,336,833 | 8/1967 | Villers | 356/447 |
| 3,892,494 | 7/1975 | Baker et al. | 356/237 |
| 3,994,586 | 11/1976 | Sharkins et al. | 356/445 |
| 4,073,590 | 2/1978 | Brown | 356/209 |
| 4,097,751 | 6/1978 | Egan et al. | 250/571 |
| 4,289,400 | 9/1981 | Kubota et al. | 356/445 |
| 4,441,124 | 4/1984 | Heebner et al. | 250/572 |
| 4,508,450 | 4/1985 | Ohshima et al. | 356/237 |

Primary Examiner—Stephen C. Buczinski
Attorney, Agent, or Firm—Donald J. Singer; Stanton E. Collier

[57] ABSTRACT

The microreflectometer system, forming a 0.01 mm$^2$ area spot, scans a mirror coating for defects of a mirror having a diameter of about 30 centimeters. Tens of thousands of reflectivity measurements are automatically taken as a computer controlled three dimension stage having the test mirror therein is selectively controlled. The reflectivity of each measurement either relative or absolute is used to determine the condition of the coating.

1 Claim, 2 Drawing Sheets

MICROREFLECTOMETER SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to means for testing high-power laser mirrors, and, in particular relates to an apparatus for measuring mirror reflectivity of areas on the order of 0.01 mm$^2$.

Mirrors used in high-power laser applications must have high reflectivity in order to avoid excessive absorption of incident radiation. Heat transfer analysis indicates that, under some critical conditions, the area of small mirror imperfections may grow during laser operation, leading to excessive heating and destruction of the mirror. The critical conditions for the initiation of this phenomenon (known as thermal runaway) depend on the geometric scale of the surface imperfection, its absorptivity, the incident radiation intensity, and the surface temperature level at which the mirror coating deteriorates. Since the latter two parameters are fixed, it is important to characterize coating imperfections with regard to geometric scale and reflectivity, prior to the use of the mirror in an actual laser. High reflectivities are generally achieved by the use of thin multilayer optical coatings of dielectric over a metal coating. The achievement of the desired reflectivity is usually confirmed, prior to a high-power laser test, by the use of a reflectometer. Conventional reflectometers provide average values of reflectivity over relatively large areas on the order of 1 cm$^2$, yet visual inspection of coated mirrors sometimes indicates small-scale surface imperfections from, 0.01 to 0.1 mm$^2$ in area. If a laser mirror has a diameter of about a foot, the number of measurements using a conventional reflectometer that inspects an area of about 1 cm$^2$, is on the order of 500 to 1000. For a microreflectometer that inspects 0.01 mm$^2$, it takes 10,000 measurements to scan a 1 cm$^2$ mirror area. Using a manual system of scanning a mirror surface would clearly be a very time consuming process.

These drawbacks have motivated a search for an improved reflectometer system.

SUMMARY OF THE INVENTION

The present invention overcomes the problems encountered in the past by providing a microreflectometer system which is capable of measuring reflectivity of an area of about 0.1 mm$^2$ over a large area in a very rapid manner.

This device could be used in either of two operational modes. Either the entire mirror reflectivity could be scanned under computer control as described below, or the surface could be inspected visually and suspected defects scanned over smaller areas for reflectivity variations. This latter local scan could be accomplished either automatically or manually.

The mirror to be tested is attached to a scanning machine that causes the mirror to move in a predetermined manner while the microreflectometer measures the reflectivity.

The scanning machine has a three axis stage that is independently translated in each axis by stepper motor drives. A computer directs the stepper motor drives and position encoders. The encoders send to the computer the present position of the stage.

A microreflectometer illuminates a selected area of about 0.01 mm$^2$ of the mirror and outputs photodetector signals with respect to a reference mirror and the mirror under test. A ratiometer receives the photodetector signals and then forms a digitized reflectivity signal that is proportional to the ratio of a mirror photodetector signal to a reference mirror photodetector signal. The reflectivity signal as a function of test mirror coordinates can be stored and displayed by the computer with appropriate display devices.

The microreflectometer has a coherent radiant energy source of a given wavelength. A beam emitted from the source is divided into a reference mirror beam and a signal beam by a beamsplitter. The reference mirror causes the reference mirror beam to be reflected back to the beamsplitter. The mirror under test also causes the signal beam to be reflected back to the beamsplitter. Both reflected beams are made to fall on a photodetector. A beam chopper appropriately placed causes the photodetector to measure alternately the reflected reference and signal beams. The photodetector outputs a signal that is proportional to the intensity of the incident beam.

The microreflectometer system, forming a 0.01 mm$^2$ area spot, scans a mirror coating for defects of a mirror having a diameter of about 30 centimeters. Tens of thousands of reflectivity measurements are automatically taken as a computer controlled three dimension stage having the test mirror therein is selectively controlled. The reflectivity of each measurement either relative or absolute is used to determine the condition of the coating.

It is therefore one object of the present invention to provide for a mirror microreflectometer that is able to measure reflectivity of areas as small as 0.01 mm$^2$.

It is another object of the present invention to provide for a mirror microreflectometer system that is able to automatically scan a test mirror.

These and many other objects and advantages of the present invention will be readily apparent to one skilled in the pertinent art from the following detailed description of a preferred embodiment of the invention and related drawings.

DETAILED DESCRIPTION OF THE PREFERRED EMBODIMENT

Figure 1:
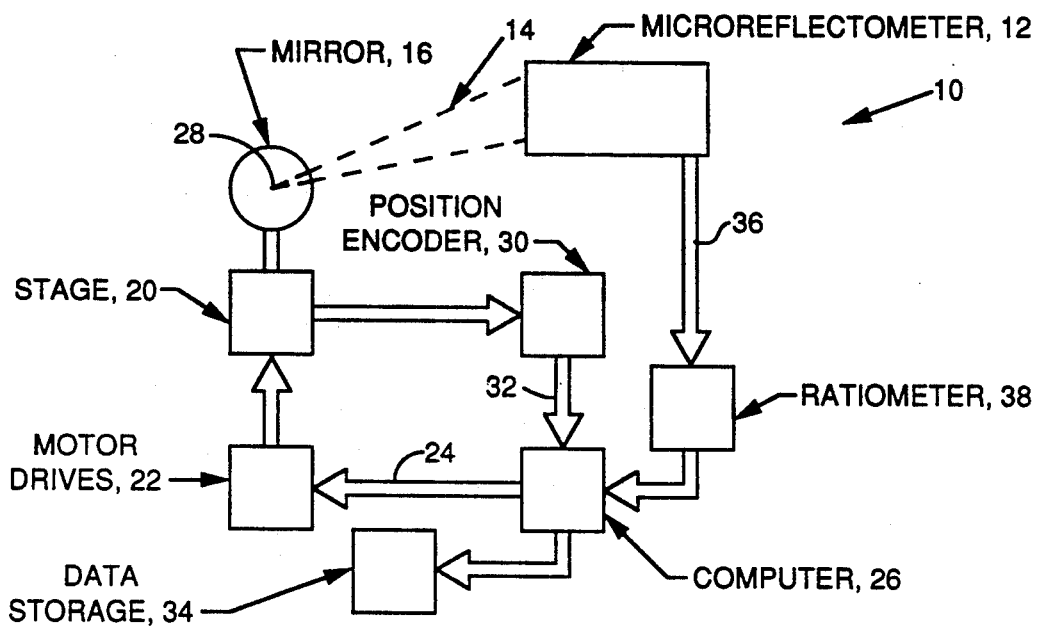
FIG. 1 is a diagrammatic representation of the microreflectometer system of this invention.

As noted above, geometric scale and reflectivity of imperfections on high-power laser mirrors directly bear on the question of thermal runaway.

In order to gain an understanding of the problems, the surface temperature resulting from small imperfections in high-reflectivity films is estimated for incident radiation on three types of defects: disc, slab (scratch), and edge imperfections. Considering a circular imperfection of radius a with an absorption of incident radiation denoted by q (cal/cm$^{-2}$/sec), after long times ($a^2$/Kt << 1), the temperature increase at the surface is $$\Delta T_{disc} = qa/k[1 + 0 \, (a^2/Kt)] \quad (1)$$

where k=conductivity, k=diffusivity, and t=time. See Table 1 for typical values of these parameters. From the above, it is seen that the surface temperature increase approaches the asymptotic value qa/k as t→∞. If this temperature is above the thin-film degradation temperature, thermal runaway will occur; otherwise, no damage will occur. Hence, for a given film, surface material, and heat absorption rate, there is a critical radius below which no damage occurs.

TABLE 1

THERMAL PROPERTIES OF SOME METALS

| Metal | Density, (g/cm$^3$) | Specific Heat, c (cal/g°K) | Conductivity, K (cal/cm sec °C. | Diffusivity K = k/(c) cm$^2$/sec |
|---|---|---|---|---|
| Silver | 10.49 | 0.0556 | 1.00 | 1.71 |
| Gold | 19.30 | 0.0308 | 0.70 | 1.18 |
| Copper | 8.94 | 0.0914 | 0.93 | 1.14 |
| Molybdenum | 10.22 | 0.06 | 0.34 | 0.55 |

For the case of a two-dimensional slab (scratch) imperfection of width 2a, the corresponding surface temperature increase after long time is $$\Delta T_{slab} = qa/\pi k[ln(4Kt/a^2) + 2 - \gamma + O(a^2/Kt)] \quad (2)$$

where γ=0.5772 (Euler's constant). In this case the temperature continues to increase with time. The occurrence of thermal runaway will depend on the duration of the heating pulse, the length of the scratch, and the thermal boundary conditions.

Finally, a two-dimensional imperfection of width a in a thin film at the edge of a mirror is considered. The edge geometry considered is typical of an unstable resonator scraper mirror used to extract energy from high-power laser beams. A coolant passage at temperature $T_R$ is assumed at a mean distance of R from the edge. The physical case is approximated by radial thermal flow in a sector of angle θ where θ is the angle between the mirror top and side surfaces. After long times a steady-state solution is obtained wherein the thermal flux at each radius is qa. Assuming $T_R$ is known, the surface edge temperature, denoted $T_{edge}$, is then $$T_{edge} = T_R + qa/\theta k[ln(R/a) + O(a^2/Kt)] \quad (3)$$

Thus the surface temperature approaches an asymptotic value because of the cooling passage. This asymptotic value can be plotted against defect size after suitable normalization. If the substrate melting temperature and the absorbed heat flux are known, this plot and Eq. (3) are useful for estimating the vulnerability of scraper mirrors to thermal runaway resulting from thin-film imperfections at the mirror edge. The above analysis is noted in H. S. Carslaw and J. C. Yaeger, *Conduction of Heat in Solids*, Oxford University Press, (1959) pp 262, 264 and 497.

In the above equations the absorbed heat flux q is the product of the incident radiation intensity and the absorptivity of the imperfection. A microreflectometer 12, shown in FIG. 1, therefore, is required to quantify the size and reflectivity of an observed defect before a decision can be made (using one of the above three equations, depending on the defect type) as to whether a mirror 16 would survive a high-power laser beam. For the purpose of this decision, one could neglect the small scattering loss typical of laser mirrors and assume that the absorptivity = 1 − reflectivity.

The above equations indicate that a reflectivity loss of the order of 10% over spot sizes ranging from 0.1 to 1.0 mm in diameter would lead to thermal damage on mirrors subjected to the flux loadings typical of high-power lasers. Nominal values used for these calucations was ΔT=O(100°), k=O(0.1 mm). This suggests that a microreflectometer 12 with a spatial resolution of 0.1 mm and an accuracy better than 10% would assist users of such lasers in determining the survivability of mirrors that have small surface defects.

A microreflectometer system 10 is illustrated in FIG. 1 having microreflectometer 12 therein. A laser signal beam 14 is focused onto the surface of a mirror 16. The ratio of the intensity of the light reflected from mirror 16 to a reference intensity is proportional to mirror 16 reflectivity at the location of a focused spot 28. The spatial resolution of the measurement is the size of the focused spot 28, which can be made as small as a few wavelengths of the interrogating light. The theoretical spot size is d=fλ/D, where f is the focal length of a spot-forming lens, λ is the wavelength of the incident light, and D is the laser beam diameter. For a typical HF microreflectometer d=13.5 μm, and for the He-Ne microreflectometer d=2.5 μm.

Referring further to FIG. 1, mirror 16 is mounted on a three axis translation stage 20 that is driven by stepper motor drives 22. Predetermined drive signals 24 from a computer 26 cause drives 22 to move stage 20 through a desired test pattern, not shown, such as a rectangular grid so that focused spot 28 moves over mirror 16 surface. Note that other than flat mirrors may require a more elaborate test pattern than a rectangular grid. A position encoder 30 converts the x-y-z position of stage 20 to digital position signals 32 that are stored by computer 26. If a microprocessor is used in place of computer 26, an additional data storage device 34 may have to be provided. Suitable output devices, not shown, can be used to display the data for analysis.

Microreflectometer 12 causes laser signal beam 14 to be focused on mirror 16 to form focused spot 28 having an area of about 0.01 mm$^2$. Intensity signals 36 output from microreflectometer 12 are input into a ratiometer 38 where a relative reflectivity value is formed which compares mirror 16 reflectivity to a reference mirror reflectivity. As stated above, characterizing coating imperfections with regard to geometric scale and reflectivity are of primary importance, not absolute reflectivity. Clearly the reflectivity of the defect can be compared to other non-defect areas of mirror 16 and also to a reference mirror of known reflectivity.

Data acquisition in microreflectometer system 10 involves communication between ratiometer 38, position encoder 30, computer 26, and data storage device 34. At each data point, computer 26 would optimize the focus by moving stage 20 parallel to laser signal beam 14 until a maximum is reached in intensity signals 36. The relative reflectivity value would be given to data storage device 34 along with mirror position coordinates from position encoder 30. After this, computer 26 commands drives 22 to move mirror 16 to the next data point to be measured. Data rates on the order of a thousand points per second can be accomplished in this manner thus allowing a complete scan of mirrors 16 in a relatively short time as compared to manual scanning as noted above.

Figure 2:
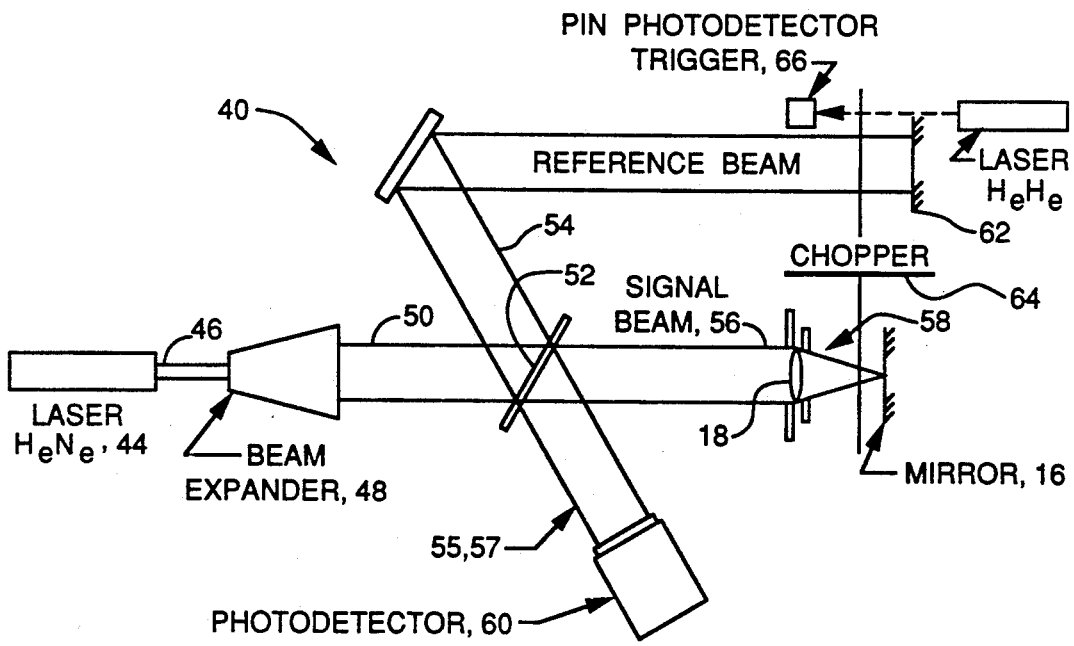
FIG. 2 is a diagrammatic representation of a microreflectometer of the present invention.

FIG. 2 illustrates a one photodetector microreflector 40. A laser 44 such as a HeNe laser outputs a beam 46 to a beam expander 48. An expanded beam 50 from beam expander 48 falls upon a beamsplitter 52 that causes a reference beam 54 and a signal beam 56 to be formed.

Signal beam 56 is focused on mirror 16 by spot forming lens 18. A set of baffles 58 block extraneous light from lens 18. A portion of signal beam 56 is returned through lens 18 that is not scattered by a defect on mirror 16. A reflected signal beam 57 is reflected off beamsplitter 52 into photodetector 60.

A reflected reference beam 55 is a portion of reference beam 54 that reflects off a retroreflector 62 to beam splitter 52 and also is detected by photodetector 60.

A beam chopper 64 alternately blocks reflected signal beam 57 and reflected reference beams 55 so that the output from photodetector 60 is either a signal intensity or a reference intensity output. Because they are detected at different times, source intensity fluctuations can influence the relative reflectivity measured, which is proportional to the ratio of signal intensity to reference intensity. A trigger 66 is coupled to chopper 64 so that a digital oscilloscope, not shown, can properly display the data.

The digital oscilloscope, not shown, can be used to acquire and reduce the data. The digital oscilloscope calculates the average ratio of the reflectivity signal to the reference signal. It is this latter ratio that is proportional to the mirror reflectivity at focused spot 28.

The spatial resolution of microreflectometer 40 was measured by moving a sharp-edged mirror past the measurement point. The reflectivity signal decreased from 100% to zero within 0.1 mm. To assess the measurement precision, many measurements were made at the same spot on mirror 16. The measured ratio of signal beam to reference signal was always within 0.5% of the mean value.

Finally, the sensitivity of microreflectometer 40 to misalignment was investigated. The effect of mirror tilt was assessed by affixing mirror 16 to a gimballed mirror mount and tilting it a known amount while measuring the reflectivity ratio. A 2-degree tilt has a small effect on the reflectivity measurement. This is expected from the relatively small f number (f=3.5) used for the focusing lens, which results in a wide acceptance angle for the reflected light. Since a small f number is required to focus the beam to a small spot, it is expected that all microreflectometers will share this attribute of small sensitivity to tilt misalignment.

The effect of misalignment in the focal direction is more severe. When mirror 16 is moved by ±10% of lens 18 focal length in a direction perpendicular to mirror 16 surface, the measured reflectivity ratio varies. When mirror 16 is moved toward focusing lens 18, the ratio is seen to increase to more than a factor of 1.5 over its value when microreflectometer 40 is properly focused. When mirror 16 is moved away from lens 18, the ratio decreases. This suggests that each reflectivity measurement should include a separate determination that the instrument was properly focused.

To scan other than flat mirror, more degrees of freedom in mirror alignment than x-y-z translation may be required to eliminate the effects of tilt and focus misalignment. For the example of a spherical concave mirror, the tilt of the mirror edge with respect to the center is less than the requirement of two degrees if the ratio of the mirror diameter to its radius of curvature is less than 0.07. For reflectivity measurements on a shorter radius of curvature mirror, the mirror tilt (and focus) would also have to be set by the computer, or localized scanning only could be accomplished.

Figure 3:
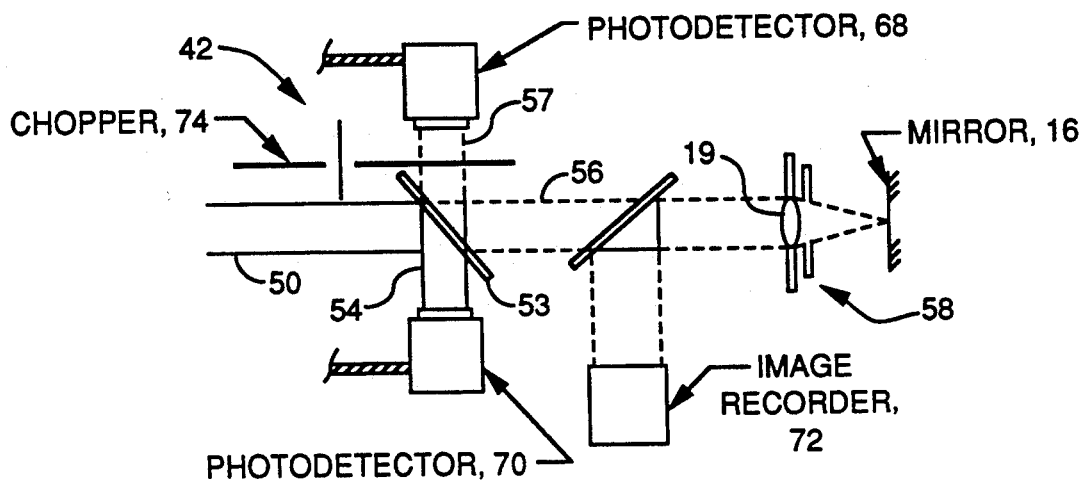
FIG. 3 is a diagrammatic representation of an alternate design for the microreflectometer.
Figure 4:
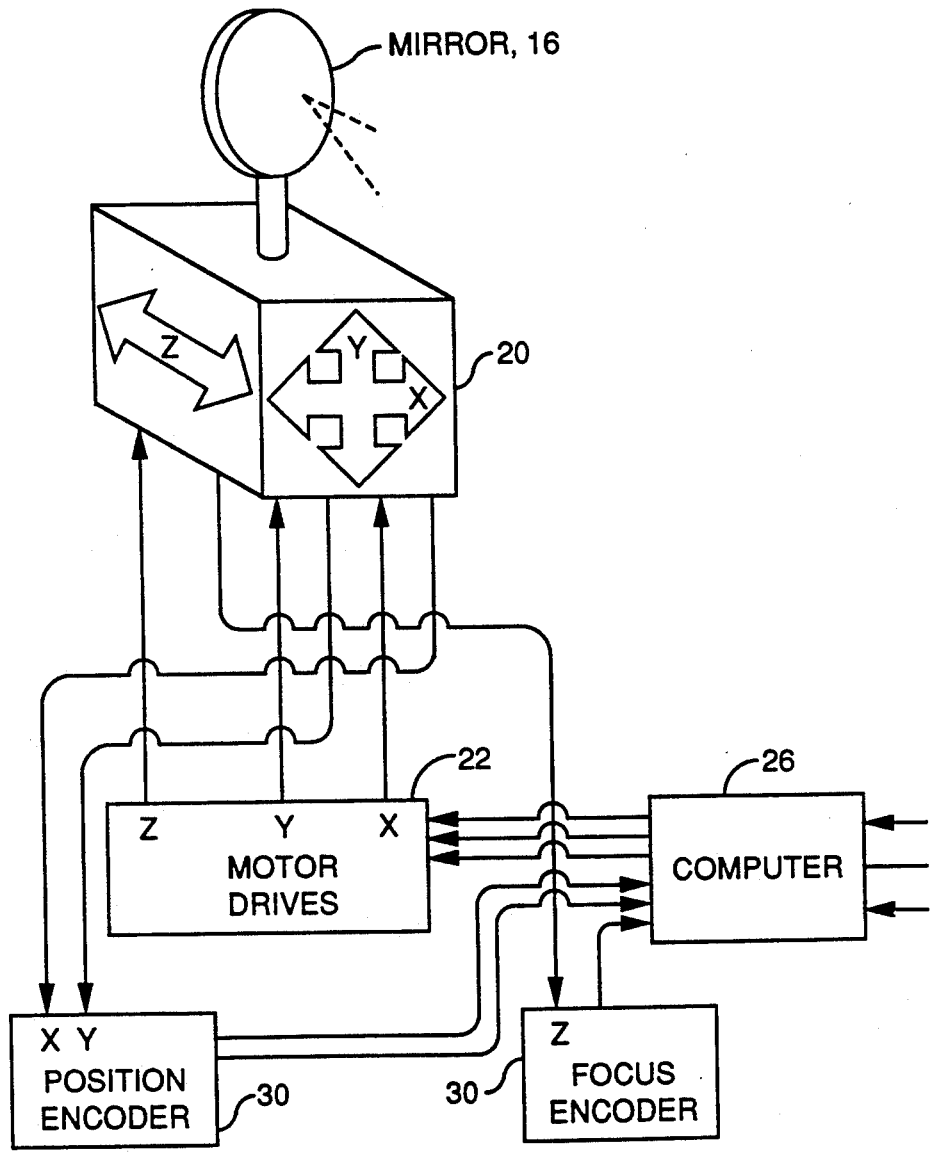

A two detector microreflectometer 42 is shown in FIG. 3. Beam 50 is split into reference beam 54 and signal beam 56. Reference beam 54 falls directly on a reference photodetector 70 for indicating reference intensity and change. A reflected signal beam 57, a portion of signal beam 56, after reflecting off mirror 16 returns to a reflected signal photodetector 68. A chopper 74 intercepts beam 57 so that a background level is obtained. An image recorder 72 is used to photograph the defect on mirror 16 or to observe focusing of the spot.

In practice HF laser microreflectometer 42 has a $CaF_2$ lens 19 and a ZnSe beamsplitter 53 that reflects a portion of expanded beam 50 as reference beam 54 onto a laser power meter photodetector 70 to provide an indication of the steadiness of the laser output. Reflected signal beam 57 from mirror 16 retraces its path through $CaF_2$ lens 19 onto beam splitter 53 where it is reflected through a second lens, not shown, onto an InAs photodetector 68. Chopper 74 allows measurement of the reflected signal beam 57 over the background signal directly from the oscilloscope traces. Reflected signal beam 57 is proportional to the reflectivity of mirror 16 at the position of the focused spot.

In applying microreflectometer system 10, one must consider whether a relative or absolute measure of reflectivity is desired. For a relative measure of the reflectivity, one is simply comparing the reflectivity at one point with that at other points, with the intention of discovering significant variations. Misalignment and focus uncertainties are not important in these tests since comparison is made from point to point through the same misaligned, defocused, or otherwise deficient optical system. For an absolute measurement, however, the effects of misalignment and defocusing must be considered.

With normal care in alignment one should expect to be aligned normal to the test mirror to less than half a degree. It was found that misalignment of half a degree produces an uncertainty in the reflectivity of 1.5%. This therefore represents the limit on precision caused by misalignment.

Precise focusing is obtained visually by adjusting for the brightest, smallest spot on the mirror, but this focus was checked by means of the schlieren technique, in which the beam is interrupted by a knife edge at the focus. If the knife edge enters the beam on the lens side of the focus, the shadow of the edge is seen to enter the beam spot from the side opposite that from which the knife edge enters. If the knife edge enters on the far side of the focus, its shadow interrupts the beam spot from the same side. If the knife edge enters precisely at the focus, the beam spot is uniformly reduced in intensity. It was determined that the focal distance could be repeatedly obtained to within 0.5% (0.25 mm) by visually adjusting the beam for the brightest, smallest spot.

With regard to the effect of defocusing, as the lens-mirror distance is decreased the relative reflectivity appears to increase. This occurs because shortening the lens-mirror distance increases the effective aperture of the lens, thus directing more light onto the detector. As shown in FIG. 3, there are two apertures in baffles 58, one in the lens mount and one ahead of the lens mount. As the lens-mirror distance decreases further, the aperture ahead of lens 19 begins to cut the light reaching the detector, which results in an apparent drop in reflectivity. As the lens-mirror distance increases, the lens aperture is effectively decreased, which results in an apparent decrease in the observed reflectivity of the spot on mirror 16. These variations in reflectivity are obtained with mirror-lens distance variations of up to 10%, but since it is a simple matter to focus the beam to within 0.5% of its focus, the uncertainty in reflectivity caused by uncertainty in focus is 2%.

The advantage of using a single detector to observe both signal and reference beams is that variations caused by nonlinear gain characteristics between the two detectors are eliminated. However, since the reference and test mirror intensity signals 36 are not observed simultaneously, the phase between the intensity fluctuations of each signal is not zero. Therefore, variations could be amplified when the two signals are combined. This is the disadvantage of using the one-detector microreflectometer 40. In the observations made, the standard deviation was generally small. However, occasionally the deviation would be as large as 3 or 4%. When this was the case, intensity signals 36, as observed on the oscilloscope traces, often showed a ripple of about 60 Hz. Two sources contribute to these fluctuations: intensity fluctuations in laser 44, and high-voltage fluctuations in the regulated power supply, not shown, for the photodetector. These small HeNe lasers 44 are not expected to be ripple-free. A fluctuation in beam intensity of only 1% could produce twice the fluctuation in the ratio of signal beam to reference beam intensity. Therefore, to achieve a better measure of absolute reflectivity one would have to try to control the variations in laser intensity and in the detector high voltage. Thus, a trade-off exists between the one- and two-detector systems. Either one settles for potential gain now linearities between two detectors, or one accepts the phase variations between reference and signal beams for the one-detector system. The extent to which detectors are nonlinear in comparison to intensity variations in the laser beam and in the detector high voltage determines which way the trade-off can go.

Clearly, many modifications and variations of the present invention are possible in light of the above teachings and it is therefore understood, that within the inventive scope of the inventive concept, the invention may be practiced otherwise than specifically claimed.

What is claimed is:

1. A microreflectometer system for measuring defects in a mirror coating on a mirror, said system comprising:
    a microreflectometer outputting a focused beam onto said mirror, said microreflectometer receiving a reflected signal beam formed from a part of said focused beam reflected from said mirror coating of said mirror, said microreflectometer outputting intensity signals, one intensity signal being directly related to an intensity of said reflected signal beam, another intensity signal being directly related to an intensity of a reference beam; said microreflectometer comprising:
    a laser, said laser outputting a laser beam;
    a beam expander, said beam expander receiving said laser beam and outputting an enlarged laser beam;
    a beam splitter, said beam splitter receiving said enlarged laser beam and outputting a signal beam and a reference beam;
    a lens means, said lens means focusing said signal beam to form said focused beam to a spot, said spot being about 0.01 mm$^2$, said reflected signal beam being formed from said part of said focused beam reflected from said mirror, said reflected signal beam passing through said lens means, and reflecting off of said beam splitter;
    a retroreflector reference being a reference mirror, a part of reference beam reflected off said retroreflector reference forming a reflected reference beam, said reflected reference beam passing through said beam splitter;
    a beam chopper, said beam chopper repeatedly interrupting said reflected reference beam and said reflected signal beam; and
    a detector, said detector receiving said reflected reference and signal beams and outputting said intensity signals;
    a ratiometer, said ratiometer receiving said intensity signals from said microreflectometer, said ratiometer outputting a relative reflectivity signal;
    a three dimensional translation stage, said mirror mounted upon said stage, said stage moving said spot about said mirror coating in a selected manner, said stage moving in a vertical axis to maintain said spot on a surface of said mirror coating, said stage having motor drives for movement and position encoders for outputting the position of said stage;
    a computer, said computer directing the movement of said stage through said motor drives, said computer receiving the position of said stage from said position encoders, said computer receiving said relative reflectivity signal from said ratiometer, said computer storing position information and reflectivity associated with said position information, said computer directing said stage in the vertical axis to insure that said focused beam has said spot on said surface of said mirror coating.

* * * * *